Patented Dec. 19, 1944

2,365,258

UNITED STATES PATENT OFFICE 2,365,258

PROCESS FOR THE STABILIZATION OF CELLULOSE ESTERS

Bruce S. Farquhar and Ferdinand Schulze, Waynesboro, Va., assignors to E. I. du Pont de Nemours & Company, Wilmington, Del., a corporation of Delaware No Drawing. Application March 7, 1940, Serial No. 322,762

3 Claims. (Cl. 260—230)

This invention relates to an improved process for the treatment of cellulose acetate, and other organic acid esters of cellulose, to render the same stable and substantially free from combined sulfate radicals.

It has been proposed, heretofore, to wash precipitated cellulose acetate and then submit the same to a stabilization treatment with hot water or steam. Furthermore, it has been suggested that the hot water used for the stabilization treatment be distilled water.

It has now been found, however, that such previously known processes are unsatisfactory for the production of cellulose acetate which is to be subjected to the high temperatures present in certain manufacturing processes, for example, molding processes. The washing of precipitated cellulose acetate with tap water for the removal of acetic acid, regardless of how thoroughly it is carried out, will inhibit the removal of combined acid sulfate radicals from the cellulose acetate by subsequent steam stabilization of the latter. This is due to slight quantities of calcium and magnesium in the wash water used in washing the precipitated cellulose acetate. After the acetic acid content of the precipitated cellulose acetate is reduced to about 1% or less the calcium and magnesium ions present in the wash water will combine with the combined acid sulfate radicals to neutralize the same, and the thus neutralized acid sulfate radicals tenaciously hold to the cellulose and cannot be removed by steam treatment.

In the preparation of cellulose acetate which is to be used for molding powder, or which is to be used in any process involving similar high temperatures, the problem of removing the acid sulfate radicals becomes very important.

It is accordingly an object of the present invention to provide an improved process for the production of an organic acid cellulose derivative which can be subjected to elevated temperatures without objectionably discoloring.

It is another object of the present invention to provide an improved process for the production of a cellulose acetate which is substantially free from sulfur containing radicals.

It is a further object of this invention to provide an improved process for the treatment of precipitated cellulose acetate which will substantially remove from the cellulose acetate sulfur containing radicals, and which process will not materially hydrolyze acetyl groups from the cellulose acetate.

Other objects will appear hereinafter.

In accordance with the present invention the precipitated cellulose acetate is first washed with water from which calcium and magnesium, and other alkaline earth metals, have been substantially removed until the effluent water contains no more than 0.1% acetic acid. The so washed cellulose acetate is then subjected to the action of wet steam under pressure to desulfur the same, and removing condensed steam from the mass during the steam treatment.

Precipitated cellulose acetate from which the acetic acid has been washed with water that is free from alkaline earth metal salts, contains the combined sulfate radicals in the acid condition and consequently the subsequent steam treatment readily hydrolyzes, or removes, the sulfate radical from the cellulose acetate. It is essential that the cellulose acetate be washed with sufficient water, however, to reduce the acetic acid content to below 0.1% so as to prevent hydrolysis and removal of acetyl groups. Furthermore, it is essential that condensed steam be removed continuously or periodically during the steam desulfuring step to prevent the accumulation of hydrolyzed sulfuric acid, and thus prevent hydrolyzing and removal of acetyl groups from the cellulose acetate.

The above-described steps are all essential to the hydrolysis and removal of combined sulfate radicals without objectionably hydrolyzing and removing acetyl radicals from cellulose acetate. If desired, the cellulose acetate so desulfured may be subjected to bleaching, for example, by treating the same with a weak potassium permanganate solution, followed by a discharge treatment with a weak oxalic acid solution.

The following example is illustrative of one method of carrying out the invention:

*Example*

Precipitated cellulose acetate is washed with distilled water, or mineral-free water, until it is entirely free from acid, or until it contains less than 0.1% acetic acid. The washed cellulose acetate containing from 5 to 10 times its weight of water is loaded into a pressure digester and clean wet steam is admitted to the digester until a pressure of 60 pounds per square inch has been reached. The cellulose is steamed at a pressure of 60 pounds per square inch for a period of about 60 minutes. During the steam treatment, however, the steam pressure is released and the condensate formed is drained from the mass at about 15 minute intervals. The acetyl content, calculated as combined acetic acid, of the resulting steam treated material is hardly altered, the reduction being in the order of 0.05%, and in extreme cases never exceeds 0.2%. The combined sulfate of the cellulose acetate was reduced from 0.05% before steaming, to less than 0.005% (calculated as $H_2SO_4$) after steaming. The stability to heat of the resultant product is greatly improved, for example, the undesulfured acetate will darken and even char after two hours heating at a temperature of 200° C., whereas the desulfured product will withstand heating to 200° C. for six hours without discernible discoloration.

The washing of the cellulose acetate can be carried out in any desired manner: by a batch or continuous process, and with or without agitating. The cellulose acetate is washed until it contains no more than 0.1% of free acetic acid. The water used for washing the precipitated cellulose acetate must contain not more than 10 parts of mineral residue per million parts of water, nor more than 0.2 part of calcium, magnesium, and other alkaline earth metal per million parts of water. Such water will, hereinafter, be referred to as "mineral-free water." Mineral-free water is obtainable in the form of distilled water, rain water or by subjecting water to a demineralizing treatment by known inexpensive methods which are no part of this invention. A typical analysis of water obtained by a demineralizing treatment, and suitable for use in accordance with the present invention is as follows:

| | |
|---|---|
| pH value | 5.1 |
| Turbidity | 0.07 |
| Color | 2.0 |
| Soap hardness as $CaCO_3$ | 0.6 cc.=0 |
| Calculated hardness as $CaCO_3$ | 0.24 |
| Total iron | 0.015 |
| Total solids | 10.3 |
| Ignition loss | 1.3 |
| Mineral residue | 9.0 |
| Alkalinity as $CaCO_3$ | 7.0 |
| Calcium | 0.05 |
| Magnesium | 0.03 |
| Chloride | 0.5 |
| Carbon dioxide | 26.0 |
| $SiO_2$ | 4.2 |
| Aluminum | 0.04 |
| Sulfates | 0.1 |
| Copper | 0.035 |

Except for pH, the above tabulated figures are expressed in parts per million. It is to be noted that the total mineral residue is 9 parts per million and that silica accounts for nearly half of it. The amount of calcium and magnesium present is less than 0.1 part per million. The water contains considerable carbon dioxide, which may account for the low pH value.

The steam stabilization step, although it may be carried out in any desired manner and by the use of any suitable apparatus, is probably most readily accomplished in a cylindrical rotating digester, constructed, for example, of stainless steel to resist corrosion satisfactorily. This digester is preferably rotated at a slow speed, for example, one or two revolutions per minute.

During the steam treatment of the cellulose acetate the condensate may be taken off, without reducing the steam pressure, through a trap in a more or less continuous manner, thereby maintaining a substantially constant amount of condensate in the digester at all times. With a steam pressure of 60 pounds per square inch, a total digestion time of about 60 minutes has proved quite satisfactory to substantially hydrolyze all the sulfate radicals from the cellulose acetate to produce a product of exceptionally good stability. After the steam stabilization treatment the cellulose acetate is preferably again washed with mineral-free water. Mineral-free water is used at this stage to prevent the incorporation of calcareous matter in the cellulose acetate, since the presence of calcareous matter will cause a darkening of the cellulose acetate if the latter is subjected to elevated temperatures. If the steam desulfuring treatment is carried out at pressures substantially below 60 pounds per square inch, such as, for instance, 20 pounds or 30 pounds per square inch, the time of treatment will have to be increased to several hours in order to have the cellulose acetate sufficiently desulfured. At these lower pressures it will still be necessary to drain the digester from time to time, and in this case instead of draining every 15 minutes, the digester may be drained only once an hour or so, depending on the time of treatment. The condensate from the steam stabilization treatment must be drained at least once before the stabilization is completed and preferably it is drained at least two or three times during the stabilization. If the steam stabilization is carried out at relatively low pressures, it may be unnecessary to bleach the desulfured product because the amount of color produced by steam desulfuring is proportional to the steam pressure (or temperature) used.

The pressures employed during steam stabilization may vary from 20 to 75 pounds or more. At the lower pressures the time of reaction is considerably lengthened and, for reasons of economy, the pressures of from 50 to 70 pounds per square inch are therefore preferred. The stabilization should be carried out for a period of time in hours equal to at least $$\frac{1800}{P^2}$$

where P=the gauge pressure of the steam in pounds per square inch. The amount of water present during the treatment may vary from about 3 to 10 or more times the weight of the cellulose ester being treated.

While this process has been described in terms of cellulose acetate, it is equally applicable to the desulfuring and stabilization of other aliphatic organic acid esters of cellulose such as cellulose propionate, cellulose butyrate, cellulose acetate butyrate, cellulose acetate propionate, etc. The cellulose ester may be prepared either by the solution method or by the suspension method in any of the well known processes.

By means of the process of the present invention a cellulose acetate containing very low amounts of combined sulfur, for example, less than 0.005% (calculated at $H_2SO_4$), can be produced which has high heat stability, good color, and will not decompose or darken when subjected to high temperatures. The product is, therefore, eminently suited for use in molding powders where heat stability and stability of color are extremely important. The viscosity of the resulting cellulose acetate will be lowered from 30% to 45%, and consequently when dissolved in ordinary cellulose acetate solvents yields solutions of lower working viscosity, without, however, any loss in its inherent strength, elasticity, flexiblity, etc. Acetone solutions of cellulose acetate produced in this manner have shown marked improvement in filterability, as well as a very marked improvement in stability. Yarns spun from such solutions display more uniform physical properties as is evidenced by more uniform dyeing, greater uniformity of strength and elasticity, more uniform luster, etc., than has been obtainable heretofore. As a further advantage of the lowered viscosity of the cellulose acetate, solutions of greater concentration may be used to good advantage. For example, in casting film from solutions of such cellulose acetate, higher casting speeds can be obtained with lower consumption of solvent. Also, because the cellulose acetate is substantially mineral free, it has a high degree of clarity and is well suited to the manufacture of photographic film.

Since it is obvious that many changes and modifications can be made in the details set forth herein without departing from the nature and spirit of the invention, it is to be understood that the invention is not to be limited to these details except as set forth in the appended claims.

We claim:

1. The process of treating cellulose acetate to remove combined acid sulfate radicals therefrom which comprises washing acetic acid from precipitated cellulose acetate solely with water having a mineral residue content not to exceed 10 parts per million and an alkaline earth metal content not to exceed 0.2 part per million until the effluent wash water contains no more than 0.1% free acetic acid, subjecting the washed cellulose acetate containing from 5 to 10 times its weight of water to steam under pressure for a sufficient period of time in hours equal to at least $$\frac{1800}{P^2}$$

where $P$=the steam pressure in pounds per square inch, to substantially hydrolyze all the sulfate radicals therefrom, and, during said steam stabilization treatment, draining condensed steam from said cellulose acetate and then again washing said cellulose acetate with mineral-free water.

2. The process of treating an aliphatic organic acid ester of cellulose to remove combined acid sulfate radicals therefrom which comprises washing the residual aliphatic organic acid from the precipitated ester solely with water having a mineral residue content not to exceed 10 parts per million and an alkaline earth metal content not to exceed 0.2 part per million until the effluent wash water contains no more than 0.1% free aliphatic organic acid, subjecting the washed ester containing from 5 to 10 times its weight of water to steam under pressure for a sufficient period of time in hours equal to at least $$\frac{1800}{P^2}$$

where $P$=the steam pressure in pounds per square inch, to substantially hydrolyze all the sulfate radicals therefrom, and, during said steam stabilization treatment, draining condensed steam from said ester.

3. The process of treating cellulose acetate to remove combined acid sulfate radicals therefrom which comprises washing acetic acid from precipitated cellulose acetate with water having a mineral residue content not to exceed 10 parts per million and an alkaline earth metal content not to exceed 0.2 part per million until the effluent wash water contains not more than 0.1% free acetic acid, subjecting the washed cellulose acetate containing from 5 to 10 times its weight of water to steam under a pressure of about 60 pounds per square inch for approximately one hour, during said steam stabilization treatment, draining condensed steam from said cellulose acetate, and then again washing said cellulose acetate with mineral-free water.

BRUCE S. FARQUHAR.
FERDINAND SCHULZE.